United States Patent
Gaines et al.

(10) Patent No.: US 7,001,687 B1
(45) Date of Patent: Feb. 21, 2006

(54) UNITIZED MEA ASSEMBLIES AND METHODS FOR MAKING SAME

(75) Inventors: Michael G. Gaines, Humble, TX (US); George R. King, The Woodlands, TX (US); Kenneth J. Schmitt, Spring, TX (US)

(73) Assignee: The Texas A&M University System, College Station, TX (US)

( * ) Notice: Subject to any disclaimer, the term of this patent is extended or adjusted under 35 U.S.C. 154(b) by 423 days.

(21) Appl. No.: 10/265,052

(22) Filed: Oct. 4, 2002

(51) Int. Cl.
H01M 2/10 (2006.01)
H01M 2/16 (2006.01)

(52) U.S. Cl. .............................. 429/37; 429/30; 429/38

(58) Field of Classification Search .................. 429/30, 429/34–39
See application file for complete search history.

(56) References Cited

U.S. PATENT DOCUMENTS

| | | | | |
|---|---|---|---|---|
| 3,616,841 A | 11/1971 | Walz | ............................ | 164/34 |
| 4,058,482 A | 11/1977 | Baris et al. | .............. | 252/425.3 |
| 4,125,676 A | 11/1978 | Maricle et al. | ............... | 429/38 |
| 4,175,165 A | 11/1979 | Adlhart | ........................ | 429/30 |
| 4,496,437 A | 1/1985 | McIntyre et al. | ............. | 204/24 |
| H16 H | 1/1986 | Kaun | ........................... | 429/29 |
| 4,818,741 A | 4/1989 | Herscovici | ................. | 502/101 |
| 4,876,115 A | 10/1989 | Raistrick | ..................... | 427/115 |
| 4,910,099 A | 3/1990 | Gottesfeld | .................... | 429/13 |
| 5,079,105 A | 1/1992 | Bossel | ......................... | 429/19 |
| 5,364,712 A | 11/1994 | Townsend | ..................... | 429/42 |
| 5,366,819 A | 11/1994 | Hartvigsen et al. | ........... | 429/17 |
| 5,418,079 A | 5/1995 | Diethelm | ....................... | 429/26 |
| 5,482,792 A | 1/1996 | Faita et al. | .................... | 429/30 |
| 5,565,072 A | 10/1996 | Faita et al. | ................. | 204/256 |
| 5,578,388 A | 11/1996 | Faita et al. | ................... | 429/30 |
| 5,589,285 A | 12/1996 | Cable et al. | .................. | 429/13 |
| 5,763,114 A | 6/1998 | Khandkar et al. | ............ | 429/20 |
| 5,853,910 A | 12/1998 | Tomioka et al. | .............. | 429/17 |
| 5,879,826 A | 3/1999 | Lehman et al. | ............... | 429/13 |
| 6,007,932 A | 12/1999 | Steyn | .......................... | 429/31 |
| 6,022,634 A | 2/2000 | Ramunni et al. | ............. | 429/34 |
| 6,051,117 A | 4/2000 | Novak et al. | ................ | 204/252 |
| 6,140,266 A | 10/2000 | Corrigan et al. | ............ | 502/439 |
| 6,146,780 A | 11/2000 | Cisar et al. | ................... | 429/34 |
| 6,232,010 B1 | 5/2001 | Cisar et al. | .................... | 429/40 |
| 6,280,870 B1 | 8/2001 | Eisman et al. | ................ | 429/34 |
| 6,284,399 B1 | 9/2001 | Oko et al. | ..................... | 429/19 |

(Continued)

FOREIGN PATENT DOCUMENTS

DE 19812155 A 9/1999

(Continued)

*Primary Examiner*—Tracy Dove
(74) *Attorney, Agent, or Firm*—Baker Botts L.L.P.

(57) ABSTRACT

The present invention comprises a unitized MEA assembly for use in a fuel cell or a fuel cell stack assembly. In the embodiments of the invention, the MEA is made integral to the frame to reduce certain risks and disadvantages associated with nonstabilized MEAs in fuel cell applications. Specifically disclosed are two preferred embodiments of the unitized MEA assembly of the present invention and methods for making same.

28 Claims, 4 Drawing Sheets

U.S. PATENT DOCUMENTS

| | | | |
|---|---|---|---|
| 6,372,376 B1 | 4/2002 | Fronk et al. | 429/41 |
| 6,387,556 B1 | 5/2002 | Fuglevand et al. | 429/22 |
| 6,387,557 B1 | 5/2002 | Krasij et al. | 429/32 |
| 6,399,234 B1 | 6/2002 | Bonk et al. | 429/32 |
| 6,403,249 B1 | 6/2002 | Reid | 429/39 |
| 6,410,180 B1 | 6/2002 | Cisar et al. | 429/41 |
| 6,413,664 B1 | 7/2002 | Wilkinson et al. | 429/34 |
| 6,531,238 B1 * | 3/2003 | King | 429/38 |
| 2002/0068208 A1 | 6/2002 | Dristy et al. | 429/34 |
| 2004/0214071 A1 * | 10/2004 | Barnett et al. | 429/44 |

FOREIGN PATENT DOCUMENTS

| | | |
|---|---|---|
| EP | 0 709 907 A1 | 5/1996 |
| JP | 05041239 | 6/1993 |
| JP | 63232275 | 9/1998 |
| JP | 2000123850 A * | 4/2000 |
| WO | WO 96/20509 A1 | 7/1996 |
| WO | WO 97/24474 A1 | 7/1997 |
| WO | WO 00/72373 A1 | 11/2000 |

* cited by examiner

UNITIZED MEA ASSEMBLIES AND METHODS FOR MAKING SAME

BACKGROUND OF THE INVENTION

The present invention relates in general to the field of proton exchange membrane fuel cells, and, more particularly, to unitized MEA assemblies and methods for making same.

FIG. 1 is a sectioned representation of a typical PEM fuel cell assembly. Known fuel cell constructions commonly include a proton exchange membrane disposed between respective anode and cathode plates. As shown in FIG. 1, a typical PEM fuel cell comprises an MEA, which itself usually consists of five layers: a PEM membrane 120, two catalytic active layers 116 and 118, and two gas dispersion layers 104 and 108. The anode flow field/separator plate is illustrated at 106; the cathode flow field/separator plate is illustrated at 110. In a typical PEM fuel cell assembly, the flow field/separator plates have manifolding passages for the gases and fluids. As these plates are composed of premium cost materials optimized for their functions, the extension of those plates to incorporate manifolding represents a cost penalty to achieve the desired functionality.

An electrochemical reaction takes place at and between the anode plate and cathode plate, with attendant formation of a product of the reaction between the fuel and oxygen, release of thermal energy, creation of an electrical potential difference between the plates, with the thus generated electric power usually constituting the useful output of the fuel cell. The general principles of operation of such fuel cells are so well known that they need not be discussed here in great detail.

FIG. 2 is another view of the typical components of a conventional PEM fuel cell assembly utilizing conventional serpentine-channeled flow field/separator plates. Flow field/separator plate 202 is located on the anode side of MEA 206; flow field/separator plate 204 is located on the cathode side of MEA 206. Illustrated in both plate 202 and plate 204 is an example of a serpentine channel used to inter alia facilitate reactant dispersion and water management in the fuel cell.

Typically, in a conventional assembly, PEM 208 of MEA 206 is extended beyond the active area 210 of MEA 206 to create a continuous sealing plane between MEA 206 and the adjacent flow field/separator plates 202 and 204. In PEM fuel cells, the PEM of the MEA is usually made from a polymer, such as a perfluorosulfonic acid, which is one of the most expensive components of the MEA. The sealing plane is usually formed so as to reflect the shape of the adjacent flow field/separator plates, and, therefore, may contain manifolds for inter alia anode gas, cathode gas, and heat exchange fluids. For instance, incorporated within sealing plane 208 are manifolding passages 212 that facilitate the flow of reactants and products to and from the individual fuel cells within a stack assembly. As shown in FIG. 2, for example, sealing plane 208 reflects the shapes of flow field/separator plates 202 and 204. Thus, the manifolds for the flow of reactants and products between the flow field/separator plates are not interrupted by the MEA.

Because of the MEA's handling and durability problems, the most critical and difficult sealing interfaces within a cell or a stack are those between the MEA and the adjacent surfaces to which it is sealed. Typically, the MEA has seal paths between itself and the adjacent flow field/separator plates. This seal is generally effected only as a function of complete cell or stack assembly in as much as the sealing is completed by the clamping force exerted on the seals by the end plates, which compress the stack with heavily torqued threaded fasteners. Consequently, the integrity of the seals is only verifiable after assembly is complete. Any compromise in the integrity of the seals requires complete disassembly and subsequent reassembly of the stack. These assembly and reassembly issues pose significant challenges to efficient, higher speed or automated assembly processes.

Due to the thin, delicate, and fragile nature of the PEM, assembling the MEA between the flow field/separator plates of an individual cell and then assembling an entire stack is difficult. Therefore, assembly is usually performed manually.

Nonuniform placement and improper location of the MEA also may lead to a multitude of problems. For instance, misplacement or movement of the MEA within a fuel cell can lead to gas leaks, premature failures, or a reduction in the power output of the MEA, resulting in cost penalties and other quality control pitfalls. If a single cell malfunctions for any of these reasons in a stack assembly, the stack assembly becomes ineffective and usually must be rebuilt. Accordingly, for successful operation of a fuel cell and fuel cell stack assembly, the MEA needs to able to be accurately and repeatedly positioned so that there is a low risk of displacement. Moreover, maintaining the constant placement of the MEA through subsequent assembly operations is key. Heretofore known means and methods of placing the MEA have not been able to attain adequate controlled placement of the MEA.

Accordingly, there is a need for a means to accurately and repeatedly position the MEA within a fuel cell. Among other things, such means should ensure that the MEA stays as placed through all subsequent assembly operations. Such means also should be economical, and preferably, should reduce costs and improve assembly efficiency. Moreover, if such means could allow the assembly of the components of a fuel cell or stack to be automatic rather than manual, this would be desirable.

SUMMARY OF THE INVENTION

Herein provided are unitized MEA frame assemblies for use in fuel cells.

In one embodiment, the present invention comprises a unitized MEA assembly comprising: a frame, the frame having an interior cavity capable of housing an MEA and an outer perimeter, and an MEA, the MEA being placed in the interior cavity of the frame thus forming a unitized MEA assembly.

In another embodiment, the unitized MEA of the present invention comprises an anterior section and a posterior section of a frame, each section having a corresponding interior cavity and an outer perimeter, and an MEA, the MEA being sandwiched between the anterior and posterior sections of the frame so that a substantial portion of the MEA is accessible through the interior cavities of each section of the frame.

Advantages of the present invention will be apparent to those ordinarily skilled in the art in view of the following specification claims and drawings.

BRIEF DESCRIPTION OF THE DRAWINGS

A more complete understanding of the present embodiments and advantages thereof may be acquired by referring to the following description taken in conjunction with the accompanying drawings, in which like numbers indicate like features, and wherein.

DETAILED DESCRIPTION OF THE INVENTION

The present invention is directed toward unitized MEA assemblies. In the embodiments of the present invention, the MEA is made integral with a separate and durable frame. This stablizes the placement of the MEA within the fuel cell and the stack assembly. The preferable design also allows the unitized frame to be preassembled and tested and then subsequently handled in semi-automated or fully-automated assembly processes. This construction greatly improves assembly productivity and reduces stack level defects.

In addition, in some embodiments, the frames used in the embodiments of the present invention also provide the gas and fluid manifolding means for each fuel cell within the stack assembly as well as intra-cell seals. In preferred embodiments, alignment features, molded in-seals, bolt holes, and water management features are included in the configuration of the frame. The preferred materials of construction for the frames of the present invention allow such features to be cost-effectively incorporated into the configuration of the frames. Moreover, the design of some of the embodiments of the frame allows the size of the functional areas of the neighboring flow field/separator plates to be minimized. Thus, material and fabrication costs associated with the flow field/separator plates are reduced.

The concepts contained in the present invention are not limited by shape, size or thickness of the frame. The frame also can be made from any material suitable for the fuel cell environment and uses. Because the frame need not be conductive, there is a far greater range of choices for materials of construction for the frame; therefore, the frame is customizable to a broad range of applications. For instance, thermoplastic frames are especially suitable.

Two nonlimiting embodiments of the present invention are described below.

Figure 1:
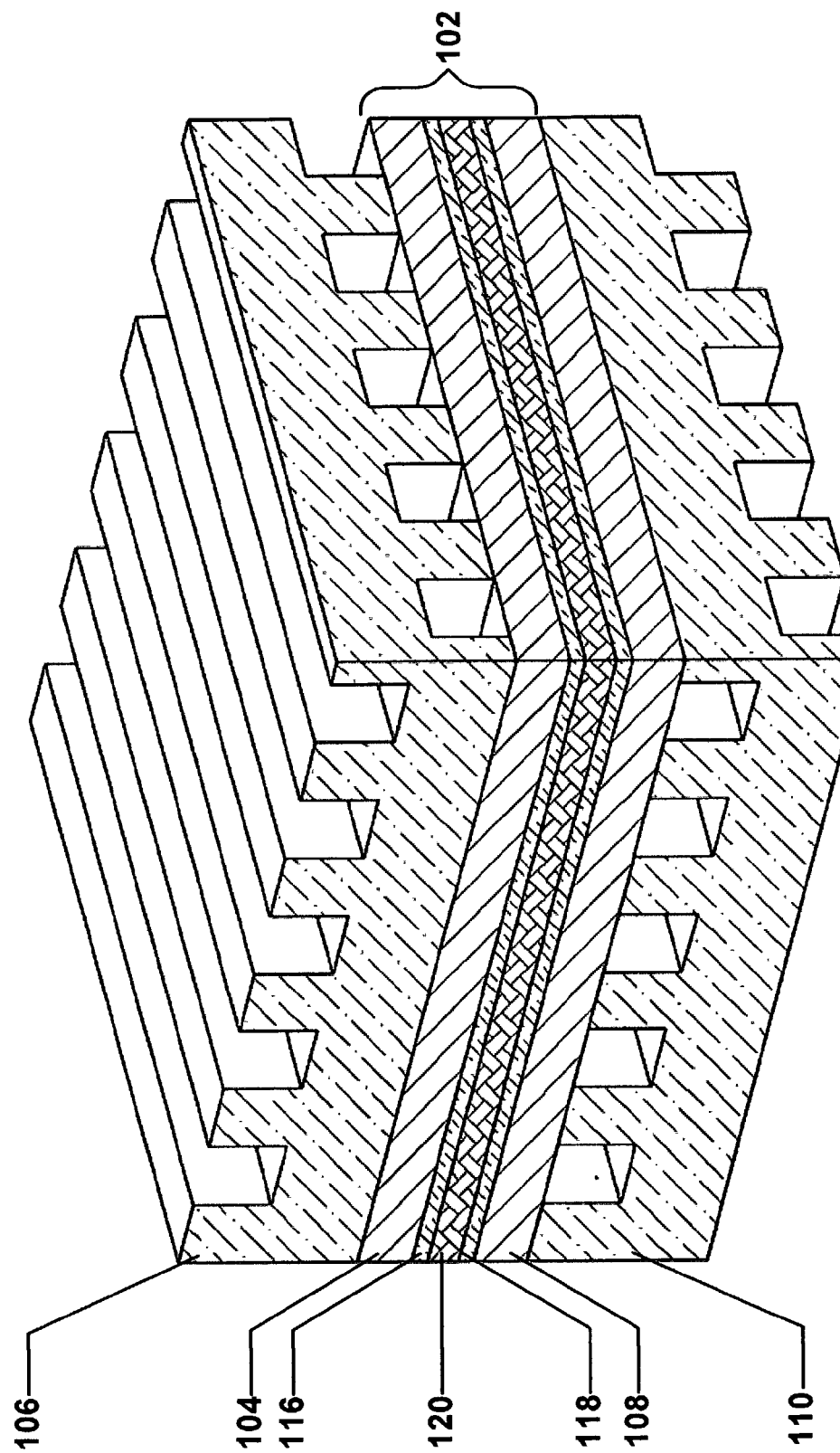
FIG. 1 is a sectioned representation of a typical PEM fuel cell assembly.
Figure 2:
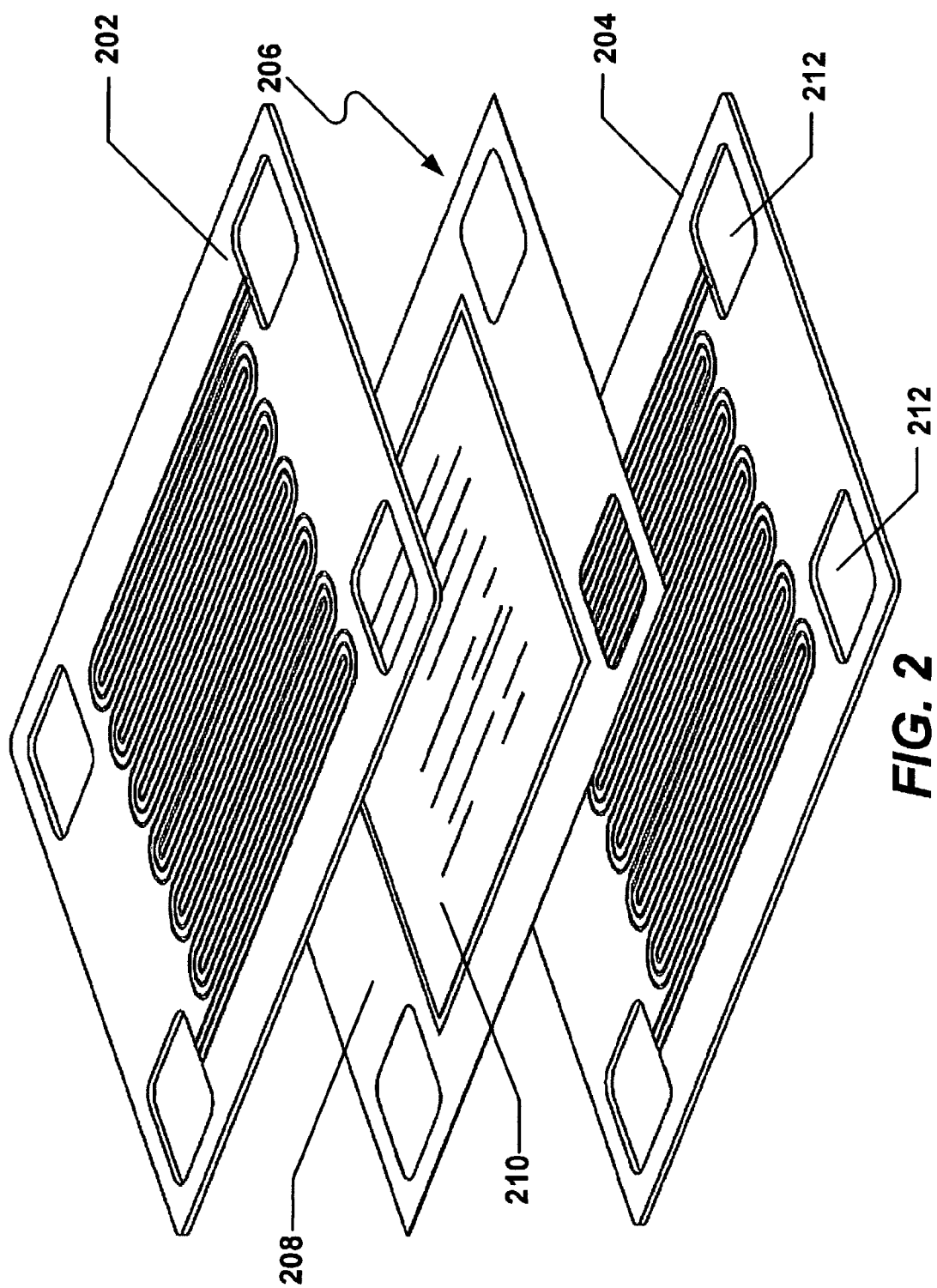
FIG. 2 is an exploded view of a typical PEM fuel cell assembly illustrating the serpentine-channeled flow field/separator plates and the MEA.
Figure 3:
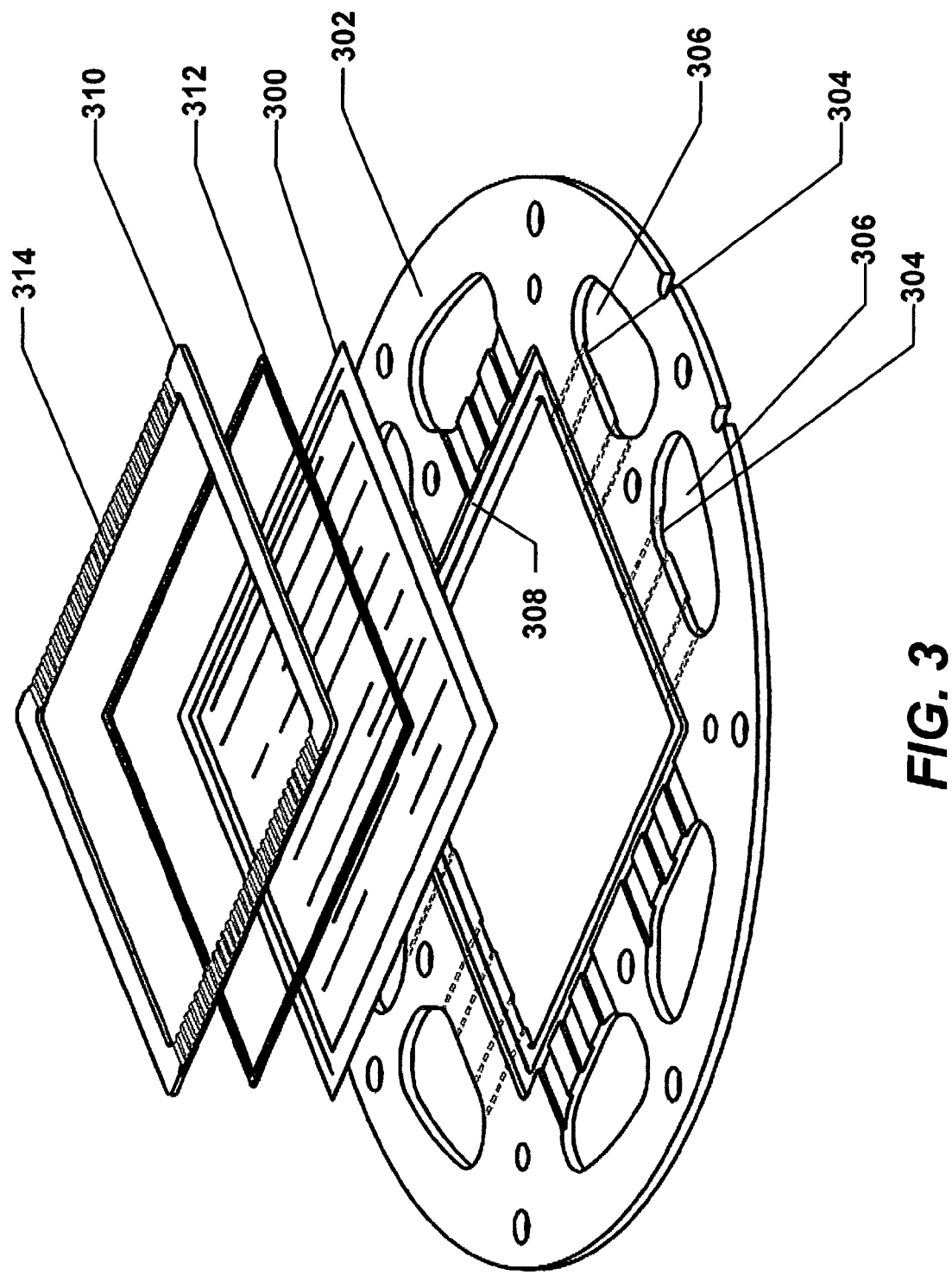
FIG. 3 is an exploded view of one embodiment of the cantilevered embodiment of the unitized MEA assemblies of the present invention.

FIG. 3 depicts an exploded view of one embodiment of a unitized MEA assembly of the present invention. Specifically, FIG. 3 illustrates one embodiment of the cantilevered embodiment of the unitized MEA assemblies of the present invention.

As shown in FIG. 3, MEA 300 is housed within and made integral with frame 302. The frame 302 shown in FIG. 3 is only one example of the types of frames that are suitable in the present invention. This type of frame is preferable, however, because it is easily manufactured in a net shape molding process such as injection or transfer molding, out of any number of commercially available thermoset or thermoplastic materials, including, but not limited to, polypropylene, polyetheretherketone, polycarbonate, or polysulfone. Other nonconductive thermoplastic resins that are amenable to the fuel cell environment may also be suitable.

For the frame depicted in FIG. 3, manifold 306 provide the fuel and the air to the MEA housed within the internal cavity of frame 302 necessary for the electrochemical reaction. The function of the manifolds 306 optionally may be enhanced by adding fuel and air supply channel 304 to the frame.

In the embodiment of the present invention shown in FIG. 3, the MEA is bonded to the lip of the interior cavity 308 of the frame 302. This bond can be accomplished by, for example, heat staking the MEA to the frame using a thermoplastic adhesive. Other methods will be available to others skilled in the art with the benefit of this disclosure; for instance, other kinds of adhesive and/or bonding techniques may be appropriate (e.g., epoxies, silicon adhesives, etc.). However, thermal bonding is the preferred method. Preferably, the bonds between the MEA and the frame should be such that no leaks occur and the seal is hermetic.

In addition to adhering the MEA itself to the frame, in this embodiment, a sealing clamp may be used to further secure the MEA to the frame. In FIG. 3, this optional sealing clamp is illustrated at 310. If used, sealing clamp 310 should preferably be shaped in the same geometry as the interior cavity of the frame. For example, in FIG. 3, sealing clamp 310 is square-shaped to conform to the shape of the square-shape of interior cavity 308 of frame 302. The sealing clamp also contains an internal cavity so that the MEA is accessible to the reactants for the requisite electrochemical exchange. The width of the sides of sealing clamp 310 preferably should be of an appropriate width for securing the MEA to the frame. Even more preferably the width of sealing clamp 310 should be sufficient to carry secondary elastomeric spring element 312. Preferably, secondary elastomeric spring element 312 is attached to sealing clamp 310 through mechanical bonding, adhesives, or any other appropriate method prior to the sealing clamp being placed in the frame. Another appropriate method of attaching the secondary elastomeric spring element to the sealing clamp is by injection molding it in place onto the sealing clamp. Once the sealing clamp and secondary elastomeric spring element are combined, that combination may then be inserted into the internal cavity of the frame on top of the MEA (which has been bonded to the frame as described above). The sealing clamp may but need not be affixed to the frame.

The sealing clamp is preferably made from a plastic that is appropriate for the fuel cell environment. For example, the following nonlimiting examples are suitable: fiberglass reinforced plastic, and phenolics. Nonconductive materials are more appropriate than conductive materials. Also, the material should be relatively incompressable.

The secondary elastomeric spring element 312 is preferably a silicon-based elastomer. Other materials also may be appropriate. The material must have an appropriate spring-rate for the available free and compressed heights to deliver desirable clamping force.

The height of the internal cavity of the frame dictates the height of the sealing clamp secondary elastomeric spring element combination. Once inserted into the internal cavity, the combination preferably should be such that the sealing clamp is appropriately loaded once the frame is assembled to mating parts of the fuel cell or stack assembly.

An optional additional feature of the sealing clamp that may be useful for effective use of this sealing clamp is a means to facilitate gas transmission to the MEA. For example, grooves such as those shown at 314 on FIG. 3 on the top surface of the sealing clamp may be used. If used, such grooves are more advantageously used if oriented in-line with the reactant supply means of the frame. Also, if used, the total cross-sectional area of the grooves should be such that the flow of the reactants from the reactant supply means of the frame is not impeded. To obtain the desirable reactant flow, the number, size, and placement of the grooves should be considered. Generally speaking, as an illustration, if the reactant supply means are wide channels, then the grooves are more effective if they are designed such that the size of the voids between the grooves on the sealing clamp is minimized (i.e., tightly spaced). The groove should also not negatively impact the sealing function by having too wide of a span between them.

Figure 4:
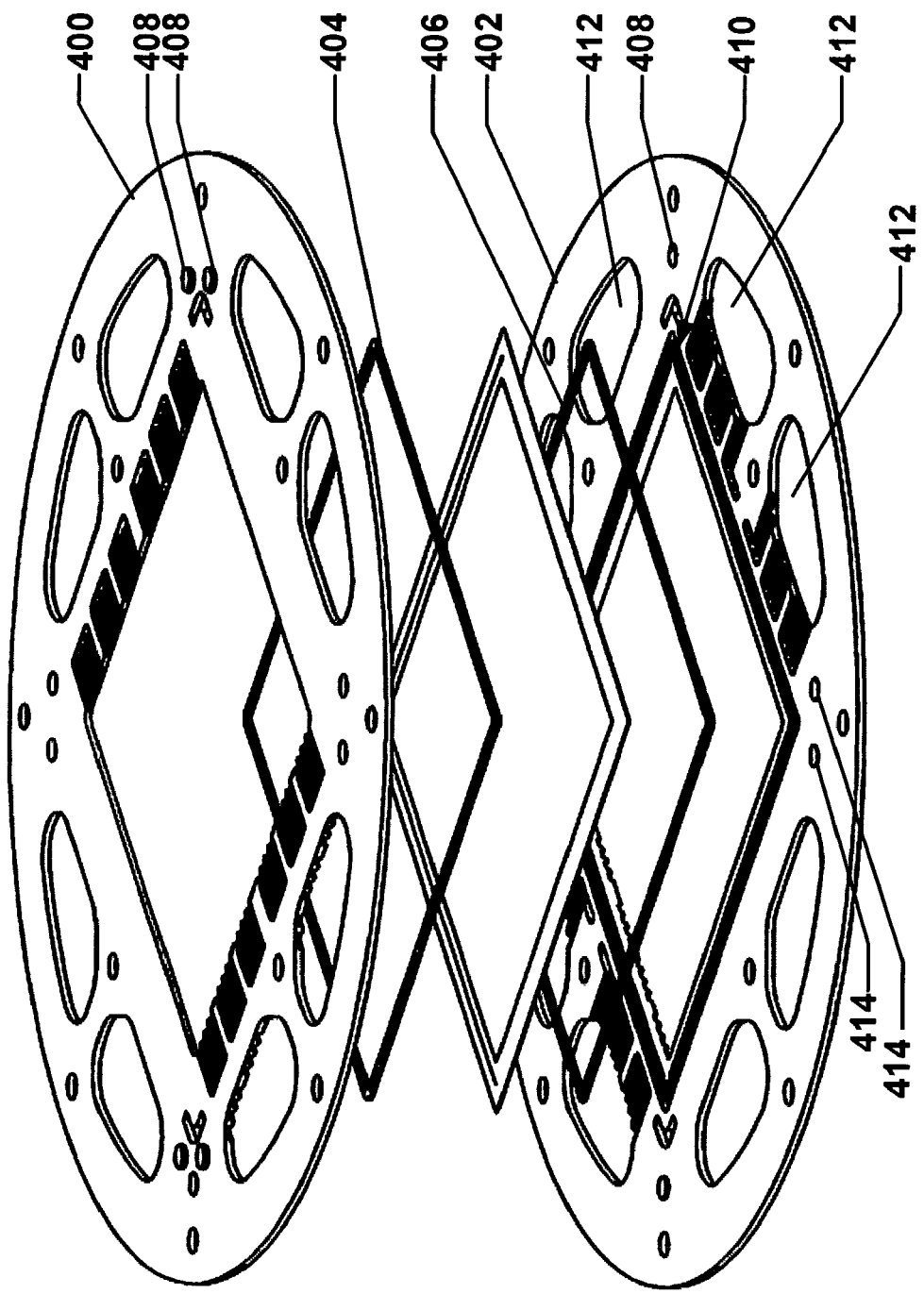
FIG. 4 is an exploded view of one embodiment of the sandwich embodiment of the unitized MEA assemblies of the present invention.

FIG. 4 depicts an alternate embodiment of a unitized MEA assembly of the present invention. This embodiment differs primarily in how the MEA is made integral to the frame. In this embodiment, two sections of a frame "sandwich" an MEA. FIG. 4 illustrates the two sections of the frame at 400 and 402, 400 being the anterior section and 402 being the posterior section. Although a circular frame is depicted in FIG. 4, any frame capable of supporting an MEA and functioning in a fuel cell environment may be advantageously used to achieve the objectives of this type of embodiment of the present invention.

Sealing of the MEA between the two sections of the frame is effected by clamping the MEA between at least one elastomeric spring element located on at least one of the two sections. Each section of the frame preferably includes an elastomeric spring element. But it is preferred that at least one of the sections have an elastomeric spring element. The elastomeric spring elements are depicted at 404 and 406. When the two sections containing the elastomeric spring elements are brought into contact with the MEA, the elastomeric spring elements hermetically clamp the MEA into the internal cavity of the frame. Optionally, the MEA may be bonded to one or both of the sections of the frame irrespective of the use of an elastomeric spring element. When assembled together, the two sections of the frame are then attached to each other by methods including but not limited to ultrasonic welding, heat staking, or bonding. It then becomes a unitized integral MEA frame assembly.

In a preferred embodiment, both sections of the frame are exactly the same and interchangeable, requiring only a single mold versus separate anterior and posterior molds. Thus, a single piece can serve as either the anterior section shown at 400 or the posterior section shown at 402. This simplifies inventory management and manufacturing as well as increasing assembly efficiency. Any appropriate nonconductive material suitable for the fuel cell environment may be used for the material of construction for the frame sections. A polysulfone-based material, for example, is suitable. It is not required that both sections be constructed from the same material.

Preferably, the elastomeric spring elements are molded in place onto an elastomeric spring seal path (shown at 410) in the interior of the lateral section of the frame by an injection molding method.

In an alternate embodiment, a thermoplastic and compliant seal such as a polyolefin plastic can be first bonded to the PEM flange of the MEA. Such a seal also may be used in conjunction with the elastomeric spring elements or without them.

An optional feature that may be advantageously employed is raised alignment features (shown at for example 408) and typical mating alignment cavities (shown at for example 414). These raised alignment features are located symmetrically or diagonally across from each other, preferably adjacent to the internal cavity. These alignment features may help facilitate the placement and effective use of neighboring components of the fuel cell assembly. For instance, the raised alignment features may align neighboring fuel cell components or fuel cell stack components.

Preferably, each section of the frame should incorporate manifolds to facilitate the flow of reactants to the MEA for the electrochemical exchange. Such manifolds are illustrated in FIG. 4 at 412.

As a nonlimiting example of how this embodiment of the unitized MEA assembly of the present is manufactured, the following description is provided. The sections of the frame are injection or transfer molded. Preferably, the sections are "net-shape molded" such that no secondary operations are required to impart all desirable aspects to the sections, e.g., raised alignment features, alignment cavities, reactant supply means, an elastomeric spring element seal path, and the like. Each finished section is then placed in a mold or a die to insert various seals and/or the elastomeric spring element onto the lateral section. The various seals and/or the elastomeric spring element is then injection molded into the elastomeric spring element seal path such that the spring element becomes integral to the frame when the frame is removed from the mold. Alternately, the various seals and/or elastomeric spring elements can be manufactured separately and then assembled to the frame yielding the same product.

The PEM MEA is a conventional PEM MEA purchased from a third-party supplier. The PEM MEA is then placed between the two lateral sections of the frame such that it will be located in and substantially fill the internal cavities of the frame sections.

The present invention, therefore, is well adapted to carry out the objectives and attain both the ends and the advantages mentioned, as well as other benefits inherent therein. While the present invention has been depicted, described, and is defined by reference to particular embodiments of the invention, such references do not imply a limitation to the invention, and no such limitation is to be inferred. The invention is capable of considerable modification, alteration, and equivalents in form and/or functions, as will occur to those of ordinary skill in the pertinent arts. The depicted and described embodiments of the invention are exemplary only, and are not exhaustive of the scope of the present invention. Consequently, the present invention is intended to be limited only by the spirit and scope of the appended claims, giving full cognizance to equivalents in all respects.

What is claimed is:

1. A unitized MEA assembly comprising:
    (a) a frame, the frame having an interior cavity capable of housing an MEA and an outer perimeter,
    (b) an MEA, the MEA being placed in the interior cavity of the frame thus becoming integral to the frame, and
    (c) an elastomeric spring element securing the MEA to the frame.

2. The unitized MEA assembly according to claim 1 wherein the outer perimeter of the frame is circular, square, or rectangular.

3. The unitized MEA assembly according to claim 1 wherein the frame has an extended portion, the extended portion extending from the internal cavity to the outer perimeter of the frame.

4. The unitized MEA assembly according to claim 3 wherein the extended portion further comprises at least one manifolding passage.

5. The unitized MEA assembly according to claim 4 wherein the manifolding passage is a fuel inlet.

6. The unitized MEA assembly according to claim 4 wherein the manifolding passage is an air inlet.

7. The unitized MEA assembly according to claim 1 wherein the frame is net shape molded.

8. The unitized MEA assembly according to claim 1 wherein the frame is constructed primarily from a polypropylene, polyetheretherketone, a polycarbonate, or a polysulfone material.

9. The unitized MEA assembly according to claim 1 wherein the MEA is bonded to the frame.

10. The unitized MEA assembly according to claim 1 wherein the elastomeric spring element is made from a silicon-based elastomer.

11. A unitized MEA assembly comprising:
   (a) an anterior and a posterior section of a frame, each section having a corresponding interior cavity and an outer perimeter,
   (b) an MEA, the MEA being sandwiched between the anterior and posterior sections of the frame so that a substantial portion of the MEA is accessible through the interior cavities of each section of the frame; and
   (c) wherein at least one of the anterior and posterior sections of the frame comprises an elastomeric spring element surrounding the interior cavity.

12. The unitized MEA assembly according to claim 11 wherein the outer perimeter of the anterior and posterior sections of the frame is substantially circular, substantially rectangular, or substantially square.

13. The unitized MEA assembly according to claim 11 wherein at least the anterior section of the frame or the posterior section of the frame has an extended portion, the extended portion extending from the internal cavity to the outer perimeter of the anterior or posterior section.

14. The unitized MEA assembly according to claim 13 wherein the extended portion further comprises at least one manifolding passage.

15. The unitized MEA assembly according to claim 14 wherein the manifolding passage is a fuel inlet.

16. The unitized MEA assembly according to claim 15 wherein the manifolding passage is an air inlet.

17. The unitized MEA assembly according to claim 13 wherein the extended portion further comprises raised alignment features or corresponding alignment cavities.

18. The unitized MEA assembly according to claim 11 wherein the anterior and posterior sections of the frame have exactly the same configuration.

19. The unitized MEA assembly according to claim 11 wherein the anterior and posterior section of the frame is net shape molded.

20. The unitized MEA assembly according to claim 11 wherein the anterior and posterior section of the frame is constructed primarily from a polypropylene, polyetheretherketone, a polycarbonate, or a polysulfone material.

21. The unitized MEA assembly according to claim 11 wherein the MEA is bonded to at least one of the sections of the frame.

22. A unitized MEA assembly comprising:
   (a) an anterior section of a frame, the anterior section having a interior cavity and outer perimeter,
   (b) a posterior section of the frame, the posterior section resembling the anterior section and having a substantially identical interior cavity and outer perimeter to that of the anterior section,
   (c) an MEA, wherein the MEA is sandwiched between the interior cavities of the anterior and posterior sections of the frame to form a unitized assembly; and
   (d) wherein the anterior section or the posterior section of the frame comprises an elastomeric spring element, the elastomeric spring element being located substantially surrounding the interior cavity of the section.

23. The unitized MEA assembly according to claim 22 wherein the anterior section or the posterior of the frame has a seal path, and the elastomeric spring element is molded onto the seal path by an injection molding method.

24. The unitized MEA assembly according to claim 22 wherein the MEA is bonded to the anterior section of the frame, the posterior section of the frame, or both.

25. The unitized MEA assembly according to claim 22 wherein the anterior section or the posterior section of the frame is made from a polypropylene, polyetheretherketone, a polycarbonate, or a polysulfone-based material.

26. The unitized MEA assembly according to claim 22 wherein the anterior section and the posterior section of the frame comprise raised alignment features and corresponding alignment cavities, the raised alignment features on one section of the frame being located so as to correspond to the corresponding alignment cavities of the other section of the frame.

27. A unitized MEA assembly comprising:
   (a) a frame, the frame having an interior cavity capable of housing an MEA and an outer perimeter;
   (b) an MEA, the MEA being placed in the interior cavity of the frame thus becoming integral to the frame;
   (c) a sealing clamp securing the MEA to the frame; and
   (d) the sealing clamp comprising reactant supply grooves being located so as to facilitate the transfer of reactants to the MEA.

28. The unitized MEA assembly according to claim 27 wherein the sealing clamp is made from fiberglass, reinforced plastics, or a phenolic resin.

* * * * *